(12) United States Patent
Lee et al.

(10) Patent No.: US 11,805,028 B1
(45) Date of Patent: Oct. 31, 2023

(54) SYSTEM FOR PROVIDING IOT DEVICE INTEGRATED CONTROL SERVICE THROUGH AI SERVER

(71) Applicant: MindwareWorks Co., Ltd., Seoul (KR)

(72) Inventors: Jae In Lee, Goyang-si (KR); Hyun Sun Cho, Seoul (KR); Seong Kuk Mun, Namyangju-si (KR); Kyung Taek Park, Seoul (KR)

(73) Assignee: MindwareWorks Co., Ltd., Seoul (KR)

(*) Notice: Subject to any disclaimer, the term of this patent is extended or adjusted under 35 U.S.C. 154(b) by 0 days.

(21) Appl. No.: 17/950,273

(22) Filed: Sep. 22, 2022

(30) Foreign Application Priority Data

Jun. 20, 2022  (KR) ........................ 10-2022-0074556

(51) Int. Cl.
*H04L 41/16* (2022.01)
*H04L 67/63* (2022.01)
*G16Y 40/30* (2020.01)

(52) U.S. Cl.
CPC .............. *H04L 41/16* (2013.01); *H04L 67/63* (2022.05); *G16Y 40/30* (2020.01)

(58) Field of Classification Search
None
See application file for complete search history.

(56) References Cited

U.S. PATENT DOCUMENTS

| 2016/0283191 | A1* | 9/2016 | Lu | ........................... G06F 3/165 |
| 2020/0092322 | A1* | 3/2020 | Boss | .................. H04L 63/1466 |
| 2021/0295835 | A1* | 9/2021 | Kim | ........................ G10L 15/22 |

FOREIGN PATENT DOCUMENTS

KR  10-2213333 B1  2/2021

* cited by examiner

*Primary Examiner* — Jason D Recek
*Assistant Examiner* — Emad Siddiqi
(74) *Attorney, Agent, or Firm* — Revolution IP, PLLC

(57) ABSTRACT

Disclosed is a system for providing an Internet-of-things (IoT) device integrated control service, in particular, a system for providing an IoT device integrated control service through an artificial intelligence (AI) server, in which a plurality of users can collectively control and manage a plurality of IoT devices for a 'smart home' and a 'connected car,' owned or managed by the users through the AI server capable of analyzing a speech or a text, so that the plurality of IoT devices can be collectively controlled and managed with only one control command, thereby minimizing time and effort to individually control and manage the plurality of IoT devices.

2 Claims, 2 Drawing Sheets

SYSTEM FOR PROVIDING IOT DEVICE INTEGRATED CONTROL SERVICE THROUGH AI SERVER

CROSS-REFERENCE TO RELATED APPLICATION

This application claims priority from Korean Patent Application No. 10-2022-0074556, filed on Jun. 20, 2022 in the Korean Intellectual Property Office, the disclosure of which is incorporated herein by reference.

BACKGROUND OF THE INVENTION

(a) Field of the Invention

The disclosure relates to a system for providing an Internet-of-things (IoT) device integrated control service, and, in particular, to a system for providing an IoT device integrated control service through an artificial intelligence (AI) server, in which a plurality of IoT devices are collectively controlled and managed with only one control command, thereby minimizing time and effort to individually control and manage the plurality of IoT devices.

(b) Description of the Related Art

The Internet of things (IoT) refers to a concept that connects all communicable objects to a network and enables them to communicate with each other. All systematically recognizable objects with short-range and long-range communication functions may include sensors or the like objects or people which can produce and use data. With the advent of the IoT era, people's interest in an IoT service, in particular, a smart home and a connected car, has been increasing year by year, and research on subjects related to the IoT service has been being actively conducted.

Conventionally, the states of various electronic devices, facilities, and vehicles at home are checked and controlled by a computer, a mobile phone, a wireless communication terminal or the like that supports the Internet, and their abnormal states are automatically and conveniently alerted through gas, fire, and anticrime sensors installed at places where security is required at home. However, a user has to control them in person through a control panel or the like, and a control means such as an app in the terminal is required.

To solve such problems, Korean Patent No. 10-2213333 has suggested a home automation system in which, when a user gives a command to a chatbot, the chatbot recognizes the user's command and operates a home device without the user's touch.

However, the foregoing related art relates to a method of inquiring a specific device connected to the smart home or a specific state of the connected car or controlling the device with a one-time command through a specific chatbot application installed in a user's own terminal, and has disadvantages in that a home device control service is not collectively provided for a plurality of users, and a plurality of homes or vehicles connected by the IoT, which are owned or managed by the users, are not collectively controlled or managed with only one control command.

Further, without an integrated control system for collectively managing the protocols continuously expanded/changed by various IoT devices supporting open protocols and multiple vehicle manufacturers (Mercedes, BMW, Tesla, etc.), it is inconvenient to install and manage a plurality of individual chatbots or automatic control applications provided by individual service companies and learn how to use the chatbots or the automatic control applications.

Meanwhile, low-power and short-range networks such as Bluetooth, near field communication (NFC), Zigbee, radio frequency identification (RFID), and Z-Wave, and broadband networks such as 4G/5G lot, LoRa, and Sigfox have been being developed for the IoT networks. In addition, manufacturers for connected cars and home automation, which are controllable through various message protocols such as advanced message queuing protocol (AMQP), constrained application protocol (CoAP), and message queuing telemetry transport (MQTT), used for exchanging message with an actual IoT device through an application, and through transmission control protocol (TCP)/user datagram protocol (UDP), have already exceeded a few thousands and will continue to expand in the future. Taking such rapid expansion of IoT types/products/services into account, it is predicted that efforts to collectively control them will be necessary in the future.

SUMMARY OF THE INVENTION

Accordingly, the disclosure is conceived to solve the foregoing conventional problems, and an aspect of the disclosure is to provide a system for providing an IoT device integrated control service through an artificial intelligence (AI) server, in which a plurality of users can collectively control and manage a plurality of IoT devices for a 'smart home' and a 'connected car,' owned or managed by the users through the AI server capable of analyzing a speech or a text, so that the plurality of IoT devices can be collectively controlled and managed with only one control command, thereby minimizing time and effort to individually control and manage the plurality of IoT devices.

According to the disclosure as proposed to solve the foregoing problems, a system for providing an Internet of things (IoT) device integrated control service through an artificial intelligence (AI) server includes: at least one bridge owned or managed by users, and connected to at least one IoT device; a client configured to transmit a speech or text related to a control command for an IoT device, which is generated by the user, to the AI server; and the AI server configured to generate a control command signal by analyzing the speech or text related to the control command for the IoT device, and transmit the control command signal to the bridge connected to the IoT device to be controlled or the IoT device to be controlled.

Here, the AI server may be configured to store and manage identification information about the user, information about the bridge, and information the IoT device connected to the bridge to match one another, or store and manage the identification information about the user and the information about the IoT device to match each other.

Further, the control command signal may include information about the IoT device to be controlled and operation control information.

Further, the AI server may be configured to specify information about the IoT device to be controlled and operation control information by analyzing the speech or text related to the control command for the IoT device.

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Below, embodiments of a system for providing an Internet of things (IoT) device integrated control service through an artificial intelligence (AI) server according to the disclosure with the foregoing objects, solutions, and effects will be described in detail with reference to the accompanying drawings.

Figure 1:
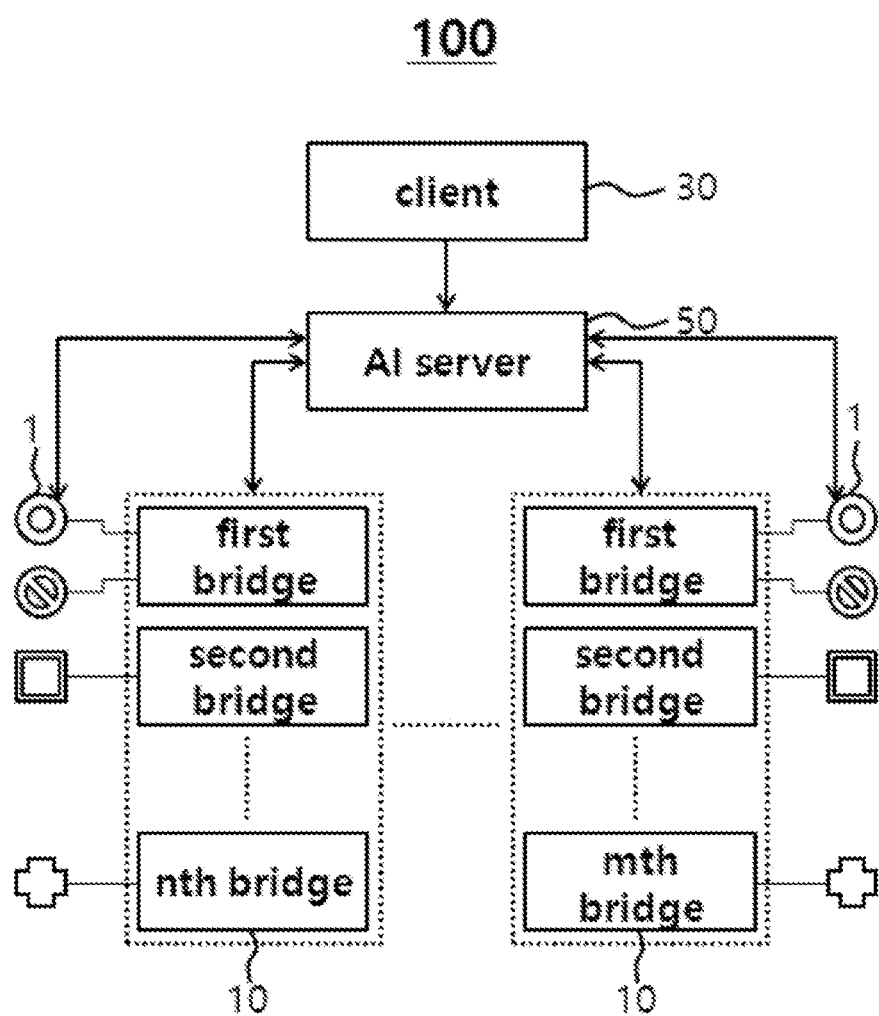
FIG. 1 is a block diagram of a system for providing an Internet of things (IoT) device integrated control service through an artificial intelligence (AI) server 5 according to the embodiment of the disclosure.
Figure 2:
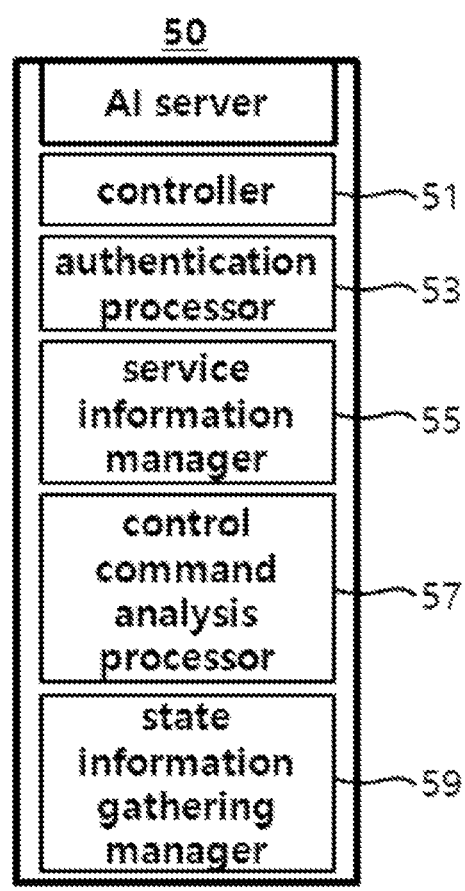
FIG. 2 is a detailed block diagram of an AI server included in the system for providing the IoT device integrated control service through the AI server according to the embodiment of the disclosure.

FIG. 1 is a block diagram of a system for providing an IoT device integrated control service through an AI server according to the embodiment of the disclosure, and FIG. 2 is a detailed block diagram of an AI server included in the system for providing the IoT device integrated control service through the AI server according to the embodiment of the disclosure.

A system 100 for providing an IoT device integrated control service through an AI server according to the embodiment of the disclosure is related to an IoT device integrated control service providing system that can provide a service to collectively control and manage IoT devices owned or managed by users.

As shown in FIGS. 1 and 2, the system 100 providing the IoT device integrated control service through the AI server according to the embodiment of the disclosure includes at least one bridge 10 owned and managed by a user and connected to at least one IoT device 1; a client 30 configured to transmit a speech or text generated by the user and involving a control command for the IoT device 1 to an AI server 50; and the AI server 50 configured to generate a control command signal by analyzing the speech or text related to the control command for the IoT device 1 and then transmit the control command signal to either the bridge 10 connected to the IoT device 1 to be controlled or the IoT device to be controlled.

The at least one bridge 10 and the at least one IoT device 1 are placed inside/outside each user's house, each user's vehicle, etc. and the at least one IoT device 1 is connected to the at least one bridge 10 by a wire or wirelessly.

The IoT device 1, which corresponds to a control target, may be controlled by the control command signal directly received from the AI server 50 or may be controlled by the bridge 10 as connected to the bridge 10 that receives the control command signal from the AI server 50. In the former case, the IoT device 1 itself is required to have a communication function for data communication with the AI server 50.

Each user may own or manage at least one IoT device 1, and therefore may also own or manage at least one bridge 10. For example, as shown in FIG. 1, a certain user may own or manage n bridges 10 (i.e., first to nth bridges), and another user may own or manage m bridge 10 (i.e., first to mth bridges).

Further, at least one IoT device 1 is connected to each bridge 10 owned or managed by each user. For example, the first bridge 10 connects with only the IoT device 1 corresponding to a light in a house, the second bridge 10 connects with a plurality of IoT devices 1 corresponding to a refrigerator and an air conditioner in the house, and the third bridge 10 connects with the IoT device 1 corresponding to a vehicle control unit.

Each bridge 10 performs an operation of controlling at least one connected IoT device 1 in response to the control command signal received from the AI server 50. Further, each bridge 10 performs an operation of transmitting the state information (e.g., on/off information, temperature information, etc.) of the connected IoT device 1 to the AI server 50 as requested by the AI server 50 or in real time or at preset intervals.

The at least one IoT device 1 is controlled or managed by a control command signal generated based on the analysis of the AI server 50 when a user generates and transmits a speech or text related to a control command for the IoT device to the AI server 50 through the client 30 at a remote place.

The client 30 performs an operation of transmitting the speech or text generated by the user and related to the control command for the IoT device 1 to the AI server 50. Here, the client 30 may correspond to any one of various terminals or media as long as it can access the AI server 50, transmit the speech or text related to the control command for the IoT device 1 to the AI server 50, and receive a response to the control or state information of the IoT device from the AI server 50. For example, when the client 30 may include a computer, a mobile phone, a smartphone, and the like connectable to a network.

The control command for the IoT device, which is transmitted to the AI server 50 by the client 30, may be given by a speech based on a verbal output or a text based on an input of words. The speech or text related to the control command for the IoT device, transmitted to the AI server 50 by the client 30 may include a simple control command corresponding to a control command for a single IoT device, and a complex control command corresponding to control commands for a plurality of IoT devices.

For example, the control command may include a simple control command corresponding to a control command for a single IoT device (e.g., a living-room light or an air purifier), such as "turn on the home living-room light" or "turn on the home air purifier," and a complex control command corresponding to control commands for two IoT devices (e.g., a heater and a car), such as "turn on the home heater and start my car."

Further, the control command may a conditional control command that corresponds to a command to check the state of at least one IoT device and control the operation of the at least one IoT device according to the conditions of the current state. For example, the control command may be a conditional control command to order an operation control according to the conditions of the current state, such as "check the lights and the heaters in the house and turn them off if they are being turned on" or "close the gas valve if it is open."

Each of the simple control command, the complex control command, and the conditional control command may be individually generated by a user and transmitted to the AI server 50, but at least two of them may be generated all together and transmitted. For example, the conditional control command for the living-room light and the simple control command for the vehicle may be generated and transmitted together, such as "turn off the home living-room light if it is being turned on, and start my car."

In addition, the usage and conduct of the plurality of connected IoT devices provided by a plurality of device manufacturers may also be inquired/checked by the single command, such as "check all the amounts of electricity, gas and water consumed at home and the amounts of electricity and gasoline consumed by my car and family's vehicles last month." Of course, such a command is actually simplified and executed as a command such as "check and show the usage of all devices I connected last month" by a natural language processing technique.

The AI server 50 receives and analyzes the control command to generate the control command signal for controlling the corresponding IoT device. In particular, when the control command is the conditional control command, the AI server 50 identifies whether to generate the control command signal with reference to the state information of each IoT device 1 stored and managed in a state information gathering manager 59.

The AI server 50 performs operations of generating a control command signal by analyzing a speech or text related to a control command for the IoT device 1, and then transmitting the control command signal to the bridge 10 connected to the IoT device to be controlled or to the IoT device to be controlled.

The AI server 50 includes a controller 51, an authentication processor 53, a service information manager 55, a control command analysis processor 57, and the state information gathering manager 59.

The controller 51 controls the overall operations of the AI server 50. In other words, when the client 30 accesses the AI server 50, the controller 51 controls the authentication processor 53 to process an authentication procedure for a user, controls the service information manager 55 to store and manage user information or the like for providing a service, controls the control command analysis processor 57 to analyze a speech or text related to a control command, and controls the state information gathering manager 59 to gather and manage the state information of the IoT devices.

The AI server 50 may store and manage identification information about users, information about a bridge, and information about an IoT device connected to the bridge while making them match one another, or store and manage the identification information about users and the information about an IoT device while making them match each other. Specifically, the service information manager 55 of the AI server 50 is configured to store and manage the identification information about users who will receive a service, the information about the bridges 10 owned and managed by these users, and the information about the IoT devices 1 connected to the bridges 10, in advance. To this end, the user is previously registered as a member to the AI server 50, and stores the identification information about the user, the information about the bridge 10 through which the user wants to get a remote control service, and the information about the IoT device 1 while making them match one another.

At least one IoT device 1 owned or managed by each user may be controlled by the control command signal of the AI server 50 as it is fully connected to the at least one bridge 10, but some IoT devices 1 may be controlled by the control command signal received from the AI server 50 as it is directly connected to the AI server 50 without being connected to the bridge 10. Therefore, the service information manager 55 may store and manage the identification information about users, the information about the bridge 10, and the information about the IoT device 1 connected to the bridge 10 while making them match one another when the at least one IoT device 1 is connected to the bridge 10, and/or store and manage the identification information about users and the information about the IoT device while making them match each other when the at least one IoT device 1 is not connected to the bridge 10.

The identification information about a user corresponds to information (e.g., the name, phone number, birth date, and the like information of a user) required to identify the user and verify whether the user's name is real. The information about the bridge 10 includes a bridge name, a bridge alias, bridge link information (i.e., address information), etc. The IoT device information includes an IoT device name, IoT device link information, IoT device operation information (on/off operations, temperature settings, etc.), etc.

When the control command analysis processor 57 receives and analyzes a speech or text related to a control command for the IoT device from the client 30, the AI server 50, in particular, the controller 51 specifies the information about the IoT device to be controlled, and operation control information based on analysis results. Then, the AI server 50, in particular, the controller 51 generates a control command signal, which includes the information about the IoT device to be controlled and the operation control information, and transmits the control command signal to the corresponding bridge 10 or the IoT device 1.

In other words, the control command signal includes the information about the IoT device to be controlled and the operation control information. The information about the IoT device to be controlled corresponds to the identification information, such as the name of the IoT device, etc., and the operation control information corresponds to information about specific operations of the IoT device to be controlled, such as on/off operations, specific temperature settings, etc. Meanwhile, the control command signal may further include detailed operation control information, for example, on-state duration, operating time, etc.

The control command analysis processor 57 analyzes and processes a speech or text related to a control command for the IoT device under the control of the controller 51. The control command analysis processor 57 identifies whether that control command is the simple control command, the complex control command, or the conditional control command through the natural language processing, and extracts a keyword as an analysis result. For example, when a speech or text related to a control command for the IoT device is "turn on the home living-room light," the control command analysis processor 57 identifies the control command as the simple control command and at the same time extracts "living-room light" and "turn on" as the keywords.

Then, the controller 51 specifies the information about the IoT device to be controlled and the operation control information, based on the analysis result of the control command analysis processor 57. For example, the controller 51 specifies the information about the IoT device to be controlled as the "living-room light" based on the keyword, i.e., the "living-room light" extracted by the control command analysis processor 57, and specifies the operation control information as "on" based on the extracted keyword, i.e., "turn on."

Then, the controller 51 generates the control command signal, which includes the information about the IoT device to be controlled and the operation control information, and transmits the control command signal to the corresponding bridge 10 or the corresponding IoT device 1. Specifically, the controller 51 transmits the control command signal, which is generated based on the information stored and managed in the service information manager 55, to the corresponding bridge 10 or the corresponding IoT device 1.

More specifically, when the information about the IoT device 1 to be controlled is specified, the controller 51 identifies whether there is a specific bridge 10 stored and managed matching the IoT device 1 specified to be controlled, with reference to information stored and managed matching the identification information of a user who transmits the speech or text related to the control command for the IoT device, among pieces of information stored and managed in the service information manager 55.

As an identification result, when there is a specific bridge 10 stored and managed matching the specified IoT device 1 to be controlled, the controller 51 transmits the control command signal to the specific bridge 10. On the other hand, when there is no specific bridge 10 stored and managed matching the IoT device 1 specified to be controlled, the controller 51 transmits the control command signal to the specified IoT device 1 to be controlled.

The controller 51 may transmit the control command signal to the specified bridge 10 or the specified IoT device 1 to be controlled, based on the information about the bridge or the information about the IoT device, which is stored and managed in the service information manager 55 and stored and managed matching the identification information about the user who transmits the speech or text related to the control command for the IoT device. The information about the bridge includes bridge link information, and the information about the IoT device includes IoT device link information, so that the controller 51 can transmit the generated control command signal to the specified bridge 10 or transmit the control command signal to the specified IoT device 1 to be controlled.

The state information gathering manager 59 stores and manages the state information of the IoT devices 1 owned or managed by users and matching the identification information of the users. The state information gathering manager 59 gathers, stores and manages the state information of the IoT devices 1 stored and managed corresponding to the identification information of the users under the control of the controller 51. Specifically, the state information gathering manager 59 may gather, store and manage the state information of the IoT devices 1 through the bridge 10, where the IoT devices 1 are linked, under the control of the controller 51, or may gather, store and manage the state information directly from the IoT devices 1.

As a result of analyzing the speech or text related to the control command for the IoT device by the control command analysis processor 57, when the control command is identified as the conditional control command, the controller 51 identifies whether to generate the control command signal with reference to the state information of the IoT devices 1 stored and managed in the state information gathering manager 59. Specifically, the controller 51 generates the control command signal when there is an IoT device 1, the state of which is maintained meeting the conditions analyzed by the control command analysis processor 57, by referring to the state information gathering manager 59, but notifies the client 30 of the state information of the IoT device 1 without separately generating the control command signal when that such an IoT device 1 is not present.

For example, when a user gives a control command of "if the home living-room light is being turned on, turn it off," the control command analysis processor 57 identifies that the given control command is the conditional control command based on "if the living-room light is being turned on." Then, the controller 51 checks the state information of the "living-room light" among the IoT devices stored and managed matching the identification information of the user by referring to the state information gathering manager 59. The controller 51 generates the control command signal related to "living-room light OFF" because of meeting the conditions when the current state is "ON," but otherwise notifies the client 30 of the current state information of "the living-room light is being off" because of meeting no conditions when the current state is "OFF."

The state information gathering manager 59 gathers, stores and manages the state information of the IoT devices owned or managed by the user by making the state information match the identification information of the user under the control of the controller 51 when requested by the controller 51 or in real time or periodically. Therefore, the state information gathering manager 59 may store and manage the current states of the IoT devices.

Further, the AI server 50 includes the authentication processor 53. The authentication processor 53 may carry out an authentication procedure for a user under the control of the controller 51 while the user is first registered as a member to the AI server 50 by accessing the AI server 50, or carry out the authentication procedure for authenticating the user's identity or the like when the user accesses the AI server 50 to receive a service after being registered as the member.

Specifically, the authentication processor 53 checks whether the current authentication for the user is valid or not when the user accesses the AI server 50. As a check result, when the current authentication for the user is valid, the IoT device integrated control service is provided. On the other hand, when the current authentication for the user is not valid, an authentication procedure is performed by a preset authentication means and then the IoT device integrated control service is provided.

Because the AI server 50 receives information (e.g., usually, the name, phone number, birth date, and the like information of the user), required to identify the user and verify whether the user's name is real, from the client 30, it is possible for the authentication processor 53 to check whether the authentication for the user is valid (i.e., the user's authentication state and whether the authentication is valid). The authentication processor 53 is storing and managing whether the authentication for each user is valid (i.e., the user's authentication state and whether the authentication is valid).

The authentication processor 53 checks whether a user's authentication is valid (i.e., the authentication state and whether the authentication is valid). Checking whether a user's authentication is valid is to check not only whether the user matches a user whose authentication has previously been confirmed to be valid but also whether the term of authentication validity has expired even though the authentication has previously been confirmed to be valid. For example, the authentication processor 53 identifies that the authentication for the user is valid when the user has previously been validly authenticated and the authentication does not exceed a preset term of authentication validity, but identifies that the authentication for the user is not valid when the user has not previously been validly authenticated because of first accessing the AI server 50 or when the term of authentication validity has expired even though the user has previously been validly authenticated.

When it is identified that the authentication for the user is not valid, the authentication processor 53 carries out the user authentication procedure through the preset authentication means and then provides the IoT device integrated control service. The authentication processor 53 newly stores and manages new user information obtained during the authentication procedure by making the new user information match the user.

The authentication processor 53 may use an authentication means previously set by selection of the user, among various authentication means such as Kakao Pay, PASS, Shinhan authentication, KB authentication, public authentication, and integrated authentication, to carry out the user authentication procedure.

The user undergoes the authentication procedure with the user's information such as the name, phone number, birth date, and the like information required to identify the user and verify whether the user's name is real, and therefore the authentication processor 53 can newly obtain the user information when the user is completely authenticated. Therefore, the authentication processor 53 identifies that the authentication for the user whose authentication is newly completed is valid, and stores and manages information about the user whose authentication is valid.

In this way, the authentication processor 53 is configured to collectively perform the user authentication for each user who will receive the IoT device integrated control service, so that an end user can avoid a repetitive identity authentication procedure, and a service provider providing the authentication procedure can also reduce time, effort and costs incurred by repeating the identity authentication that has already been validly completed immediately before accessing.

By the system for providing the IoT device integrated control service through the AI server with the foregoing objects and solutions, a plurality of IoT devices are collectively controlled and managed with only one control command, thereby minimizing time and effort to individually control and manage the plurality of IoT devices.

Although a few exemplary embodiments of the disclosure have been described, these are for illustrative purpose only and it will be appreciated by those skilled in the art that various changes may be made in these embodiments within the equivalent scope. Therefore, the technical scope of the disclosure will be defined in the following appended claims.

REFERENCE NUMERALS

1: IoT device
10: bridge
30: client
50: AI server
100: system for providing IoT device integrated control service through AI server

What is claimed is:

1. A system for providing an Internet of things (IoT) device integrated control service, the system comprising:
at least one bridge owned or managed by users, and connected to at least one IoT device by a wire or wirelessly;
a client configured to transmit a speech or text related to a control command for an IoT device, which is generated by the user, wherein the client is selected from the group consisting of a computer, a mobile phone, a smartphone, and a device connectable to a network; and
an artificial intelligence (AI) server, comprising a processor and a memory storing instructions that when executed by the processor cause the AI server to generate a control command by analyzing the speech or text related to the control command for the IoT device, and transmit the control command to the bridge connected to the IoT device to be controlled or the IoT device to be controlled,
wherein the client is configured to transmit the speech or text to the AI server,
wherein the AI server
checks the user's authentication upon the user accessing the AI server for providing the IoT device integrated control service;
stores and manages identification information about the user, information about the bridge, and information the IoT device connected to the bridge to match one another, or stores and manages the identification information about the user and the information about the IoT device to match each other;
receives and analyzes the speech or text related to the control command for the IoT device from the client, manages a state information of the IoT device; and
is configured to specify information about the IoT device to be controlled and operation control information based on an analysis result.

2. The system of claim 1, wherein the control command comprises information about the IoT device to be controlled and operation control information.

* * * * *